US012485351B2

(12) United States Patent
Nusrat

(10) Patent No.: US 12,485,351 B2
(45) Date of Patent: Dec. 2, 2025

(54) SOFTWARE CREATION PLATFORM USING TEXT-BASED INPUT

(71) Applicant: GAMING REVOLUTION FOR INTERNATIONAL DEVELOPMENT INC., Vienna, VA (US)

(72) Inventor: Mariam Nusrat, Vienna, VA (US)

(73) Assignee: GAMING REVOLUTION FOR INTERNATIONAL DEVELOPMENT INC., Vienna, VA (US)

( * ) Notice: Subject to any disclaimer, the term of this patent is extended or adjusted under 35 U.S.C. 154(b) by 0 days.

(21) Appl. No.: 18/615,929

(22) Filed: Mar. 25, 2024

(65) Prior Publication Data

US 2024/0226756 A1 Jul. 11, 2024

Related U.S. Application Data

(63) Continuation of application No. 17/864,869, filed on Jul. 14, 2022, now Pat. No. 11,969,658.

(60) Provisional application No. 63/222,363, filed on Jul. 15, 2021.

(51) Int. Cl.
*A63F 13/792* (2014.01)
*A63F 13/63* (2014.01)

(52) U.S. Cl.
CPC ............ *A63F 13/792* (2014.09); *A63F 13/63* (2014.09)

(58) Field of Classification Search
CPC ............................... A63F 13/792; A63F 13/63
See application file for complete search history.

(56) References Cited

U.S. PATENT DOCUMENTS

| | | | | |
|---|---|---|---|---|
| 9,814,983 | B2 * | 11/2017 | Johnston | A63F 13/56 |
| 10,786,737 | B2 * | 9/2020 | Shochet | A63F 13/63 |
| 11,969,658 | B2 | 4/2024 | Nusrat | |
| 2010/0029380 | A1 * | 2/2010 | Rhoads | A63F 13/10 463/43 |
| 2014/0228119 | A1 * | 8/2014 | Koenig | A63F 13/52 463/32 |
| 2019/0130701 | A1 | 5/2019 | Simons | |
| 2021/0008455 | A1 | 1/2021 | Bererton et al. | |
| 2021/0256070 | A1 | 8/2021 | Tran et al. | |
| 2022/0300966 | A1 * | 9/2022 | Andon | G06Q 30/0277 |
| 2022/0351280 | A1 * | 11/2022 | Cardenas Gasca | G06Q 30/0643 |
| 2022/0414621 | A1 | 12/2022 | Parlatto et al. | |
| 2023/0015686 | A1 | 1/2023 | Nusrat | |

FOREIGN PATENT DOCUMENTS

WO WO 2023/288143 A1 1/2023

OTHER PUBLICATIONS

International Search Report and Written Opinion from International Application No. PCT/US2022/040496 9 pages, mailed Nov. 18, 2022, application now published as.

* cited by examiner

*Primary Examiner* — Reginald A Renwick
(74) *Attorney, Agent, or Firm* — McDermott Will & Schulte LLP; Brennen P. Baylor

(57) ABSTRACT

Software creation platforms are disclosed, including platforms which provide to users templates and text-based prompts for filling out the provided templates and creating games that incorporate non-fungible token technology. Also disclosed are methods of creating software, such as video games, using the disclosed platform.

16 Claims, 15 Drawing Sheets

SOFTWARE CREATION PLATFORM USING TEXT-BASED INPUT

CROSS-REFERENCE TO RELATED APPLICATIONS

This application is a continuation of U.S. patent application Ser. No. 17/864,869, filed on Jul. 14, 2022 (now allowed), which claims priority to U.S. Provisional Patent Application No. 63/222,363, filed on Jul. 15, 2021, the entire content of each of which is incorporated herein by reference.

TECHNICAL FIELD

The subject matter described herein relates generally to a platform which allows users to create video games, including educational video games or other video games useful for teaching or training purposes, using a game-creation platform, where the game-creation platform permits the user to incorporate use of non-fungible tokens (NFTs).

Also disclosed are embodiments of a game-creation platform which permit users to create games using text-based input, and which further allow users to select game templates from provided models.

In certain embodiments of the present invention, the platform comprises the use of a text entry (i.e., input) system to configure a video game.

BACKGROUND

Video game development is costly, time-consuming and requires coding expertise generally obtainable only through formal education and/or extensive coding experience. To date, there has not been a platform available to the general public which allows users to create video games without the need for traditional coding skills, and that further permits the incorporation of non-fungible tokens.

Educational games (also referred to as "instructional," "serious" or "purposeful" games, or as "edutainment" or "edutaining" games), are games that have a purpose beyond entertainment. Educational games are increasingly being used across industries as powerful vehicles to educate, evaluate or make a social impact. Their influence is being felt, for instance, across healthcare, where games are delivering neurodevelopmental assessments to children. Educational games are also used in the defense sector, where military simulations in virtual reality add an unprecedented, tactile layer to training. Educational games are digital applications prepared for training and education, where the primary function is to give knowledge, train, inform, memorize, and teach end users.

Educational video games have immense potential to transform industries by streamlining and/or gamifying necessary and often time-consuming aspects of organizations and businesses. For example, on-boarding new employees, ensuring compliance with industry regulations, and general educational, marketing and training efforts or initiatives can be made more efficient and even enjoyable. However, drawbacks in the marketplace are inhibiting the growth of educational games, despite their utility.

As discussed above, video game development is costly, time-consuming and requires large, skilled teams. This is particularly true for educational video games, which by nature require additional expertise in the particular educational subject matter provided for in the game. For instance, many people, including those who perform jobs in which educational games would be most useful, lack coding skills necessary to create software on their own. Although there are websites that permit users to develop games without software coding knowledge, such platforms often do not provide the case and functionality necessary to enable the public to create educational games.

Although existing development environments that permit users to design applications without directly interacting with underlying code exist, no existing platforms allow a person to create a game solely by entering text in response to preset dialog prompts or questions. Nor does there exist such a platform which utilizes NFT technology.

For example, some game studios have developed entertainment-focused platforms. However, neither of these platforms allow for game creation based solely only text input, nor do they allow the use of NFT technology. Moreover, other educational or serious game studios promote educational gaming but lack platforms that allow users to create their own video games.

Another problem with existing platforms is that they do not permit the user of a platform to incorporate NFTs into a game or other software developed without writing underlying code. But NFTs can provide significant added utility to the functionality of a game or other software developed without writing code. The present invention allows a user to incorporate NFTs into software created through the use of platforms which utilize visual or textual inputs, including text-based platforms, including educational games.

Accordingly, a present need exists for a means by which games, including educational games, may be created using non-programming language inputs (e.g., solely textual inputs and/or visual inputs) on a modern platform for modern computers, modern video game consoles and/or modern mobile computing devices. A further need exists for incorporating NFT technology into such games.

BRIEF SUMMARY

The inventors disclose herein various embodiments of the method of the present invention.

Described herein are various embodiments of a platform for creating software, the platform comprising an assortment of templates for completion by responding to a series of prompts (e.g., textual prompts or visual prompts). The prompts are configured for response via textual inputs or visual inputs, and the prompts are not configured to receive input in the form of programming language or coding syntax.

Also described are various embodiments of a method of creating software, the method comprising selecting a template from an assortment of templates, and responding to a series of prompts (e.g., textual prompts or visual prompts), and optionally selecting one or more assets from an asset library. Responding to the series of prompts (e.g., textual prompts or visual prompts) does not comprise providing input in the form of programming language or coding syntax. Additionally, the asset library comprises assets in the form of non-fungible tokens (NFTs).

Also described are various embodiments of a method of sharing user-created software via a network, e.g. a digital marketplace or storefront.

Also described are various embodiments of a system, said system comprising a back-end comprising a server, a means of storage, and an operating system, and a front-end represented in images and text, wherein said system is configured for a user to interact with the front-end and not the back-end, wherein said system is configured for the user to respond to a series of prompts (e.g., textual prompts or visual prompts)

in the front end to create a piece of video gaming software, and wherein responding to the series of prompts does not comprise providing input in the form of programming language or coding syntax.

Additional features or aspects of the present invention will be readily apparent to persons of ordinary skill in the art in view of the following disclosure.

DETAIL DESCRIPTION

Figure 1:
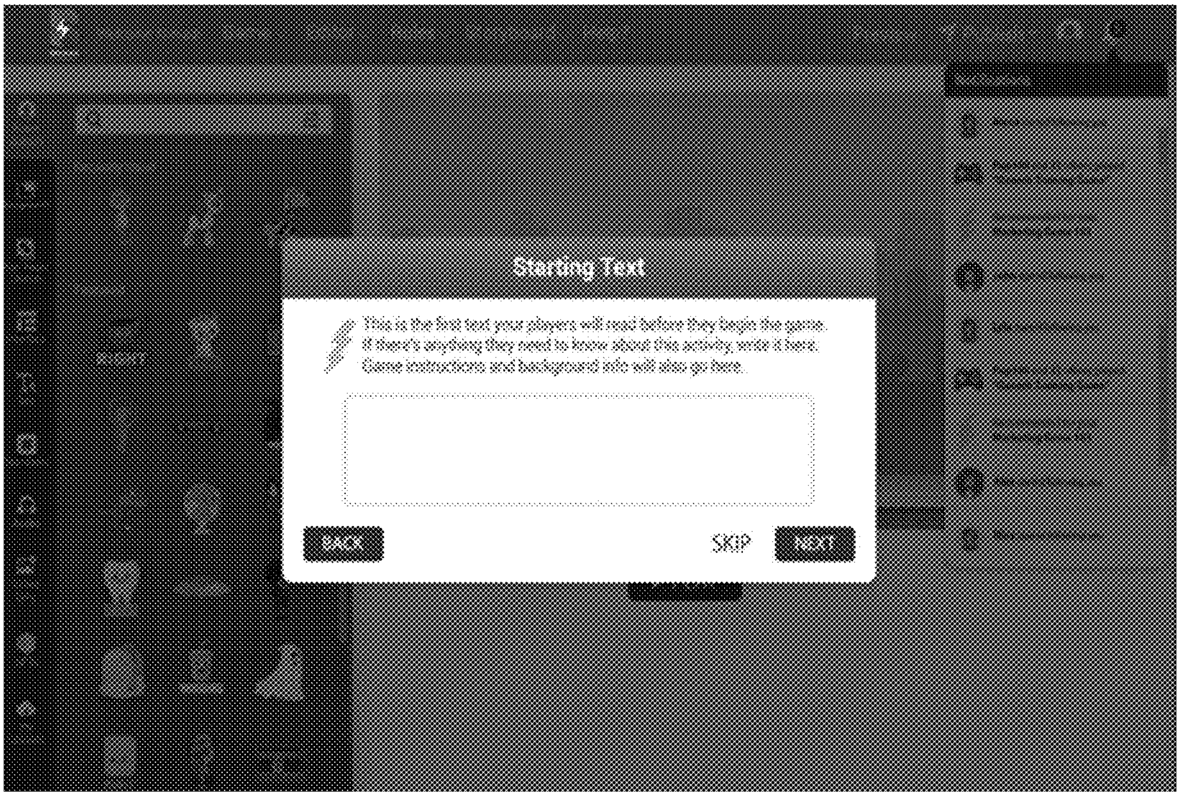
FIGS. 1-7 show exemplary prompts to be displayed by the platform of the present invention.

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

Unless otherwise defined, all technical and scientific terms used herein have the same meaning as commonly understood by a person having ordinary skill in the art to which the present invention belongs. While methods and materials similar or equivalent to those described herein can be used to practice the invention, suitable methods and materials are described herein. All publications, patent applications, patents, and/or other references mentioned herein are incorporated by reference in their entireties. In the event that any of the publications, patent applications, patents and/or other references mentioned and incorporated herein contradict the present disclosure, the present disclosure including the definitions is authoritative. Additionally, the materials, methods, and examples are illustrative only and are not intended to be limiting.

The present invention enables users to create video games, including educational video games, at low cost and without the need for coding.

In an aspect, the present invention relates to a platform for creating software, including video games, further including educational video games. Said platform requires the input of text instead of a coding language.

The present invention thus represents an efficient and convenient way for users to develop software, e.g. game software, wherein the user does not need to write underlying code. In various embodiments, the underlying code (i.e., the back-end) of the platform may be coded in any suitable programming language. Sec, e.g., FIG. 15 for a non-limiting, exemplary system architecture.

As used herein, a "platform" is an environment which provides a base upon which users can build new applications and technologies, such as video games.

In another aspect, the present invention relates to a method for creating video games, wherein the method involves inputting text in response to textual prompts, i.e. dialogue prompts or questions.

In another aspect, the present invention relates to a method for creating video games, wherein the method involves providing non-textual responses or inputs in response to visual prompts, such as icons/symbols or other non-textual signals. Input in response to such visual prompts may include, but is not limited to, uploading one or more assets (optionally NFT assets or non-NFT assets which may optionally be converted to NFTs), mouse-clicking on one or more choices, entering non-text inputs via a keyboard, etc.

A non-fungible token (NFT) is a unit of data stored on a digital ledger, called a blockchain, that certifies a digital asset to be unique and therefore not interchangeable. NFTs can be used to represent items such as photos, videos, audio, and other types of digital files. In certain embodiments of the present invention, the platform described herein comprises the use of NFTs. In such embodiments, NFTs may be used to create unique, traceable game elements.

The platform of the present invention may present prompts or questions to a user. In response to said prompts or questions, a user enters answers or instructions in the form of ordinary language text, as opposed to coding language for writing software.

In certain embodiments, the video game to be created is useful for instructional, educational, training marketing or other functional purpose.

An advantage of the present invention is the elimination of any need for a user to interact or engage with back-end systems. That is, a user does not need to write or interpret software coding language in order to produce a piece of functional software, such as a video game. The platform of the present invention comprises a graphic user interface (GUI) with which a user will interact. The present invention thus advantageously avoids the need to build a fully functioning application from scratch.

In certain preferred embodiments, the platform does not prompt users to input coding or programming language such as Python, JavaScript, Java, C, C#, C++, Golang (Go), Swift, R or PHP.

In certain preferred embodiments, the platform does not prompt users to input programming syntax.

In preferred embodiments, the platform first provides a user with an array of templates from which to select a template for further text-based inputs to generate software such as a video game, e.g. an educational video game.

In certain embodiments, the platform of the present invention may store and/or provide to a user a template or library of templates.

The user may select pre-built game assets, such as sprites, avatars, backgrounds, collectibles, obstacles, music, or other visual elements, audio elements and/or video elements.

Additionally or alternatively, a user may create any of the aforementioned elements or game components and upload or otherwise implement said user-created elements into a template in the platform of the present invention.

As described herein, an uploaded or otherwise user-created element may be converted into an NFT. In certain embodiments, the converted ("minted") NFT is owned by the user, the ownership of which is verifiable on the blockchain.

In certain embodiments of the invention, where a user has converted or minted an uploaded asset into an NFT, the resulting NFT may be used as an asset in a piece of created software and, optionally, animated or visually edited (e.g., by applying filters, visual effects, etc.) or given functionality in a piece of software (e.g., a video game) created using the platform. For example, the NFT may be used in the platform of the present invention as an avatar, a collectible item, a background, audio element, video element, or other element or asset within a piece of software such as a video game.

Alternatively, an existing NFT may be uploaded or imported into the inventive platform. In certain embodiments, where an element is already an NFT existing outside of the platform, the ownership of the uploaded or imported NFT may optionally be verified via blockchain integration.

In certain embodiments of the invention, where a user has uploaded or imported an existing NFT into the platform, the NFT may be used as an asset in a piece of created software and, optionally, animated or visually edited (e.g., by applying filters, visual effects, etc.) or given functionality in a piece of software (e.g., a video game) created using the platform. For example, an NFT uploaded into the platform of the present invention may be used as an avatar, a collectible item, a background, audio element, video element, or other element or asset within a piece of software such as a video game.

Figure 10:
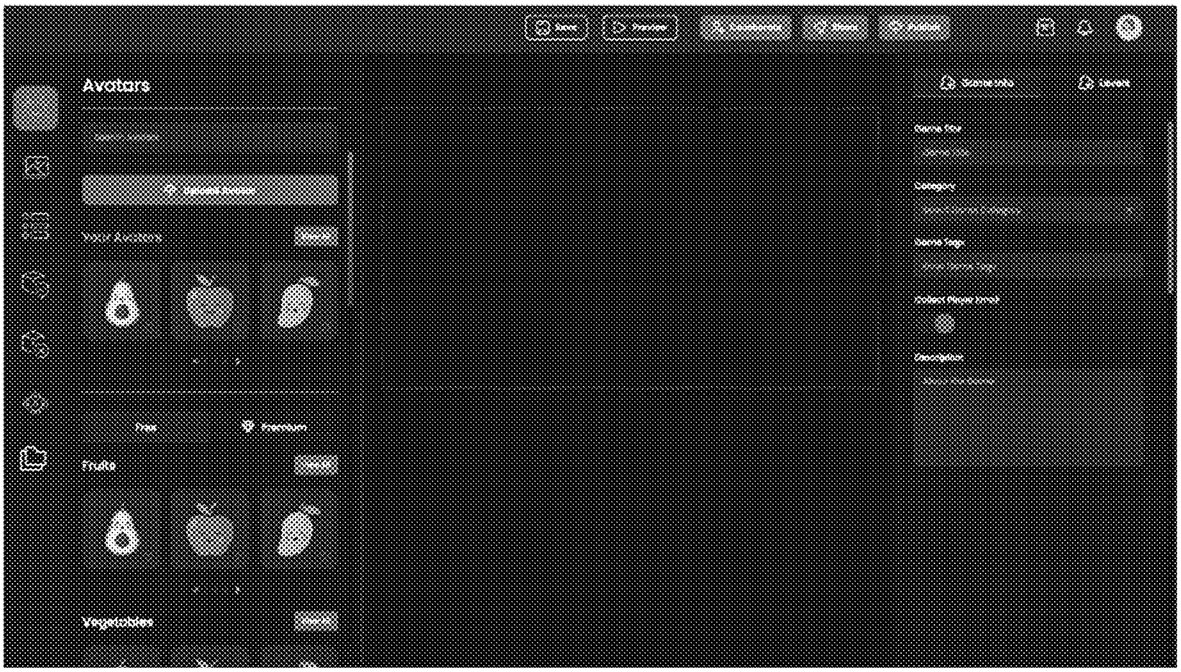
FIGS. 10-14 show various prompts and features of the platform of the present invention.

In certain embodiments of the invention, a user may search from a database or library of assets by keyword searching, including searching sprites, avatars, backgrounds, collectibles, obstacles, music, or other visual elements, audio elements and/or video elements. FIG. 10 shows an exemplary and non-limiting depiction of a searchable asset library.

Figure 11:
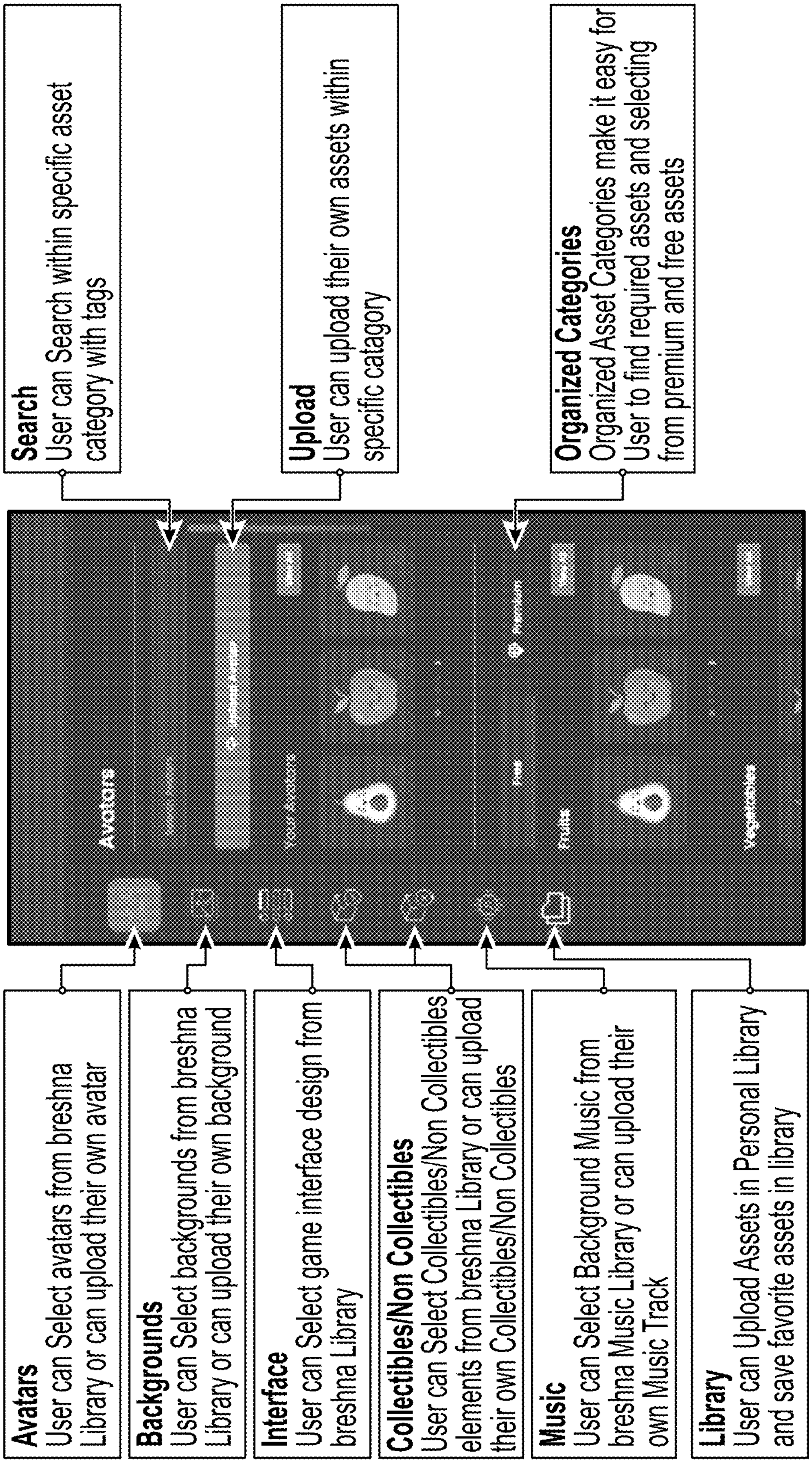

FIG. 11 shows exemplary features and filters of an exemplary asset library provided in the platform of the present invention. For example and without limitation, an asset library generally allows a user to select from uploaded or provided assets (e.g., avatars, backgrounds, music, etc.). In certain embodiments, as shown in FIG. 11, a user can search for assets using keywords or tags provided by other users, or the user can upload their own assets within a specific category (e.g., avatars). In certain embodiments, the assets may be pre-arranged into organized categories, or a user can arrange assets into categories with bespoke names (e.g., "Fruits" as shown in FIG. 11).

In certain embodiments, the search may include or exclude NFTs created by users.

In certain embodiments, the present invention allows for implementation or integration of Web3 features. As described herein, a marketplace (such as an NFT marketplace) allows for storage and/or ownership of NFT assets or games. Additionally, the inventive platform, method and system described herein permits wallet integration (e.g., cryptocurrency or NFT wallets).

Figure 12:
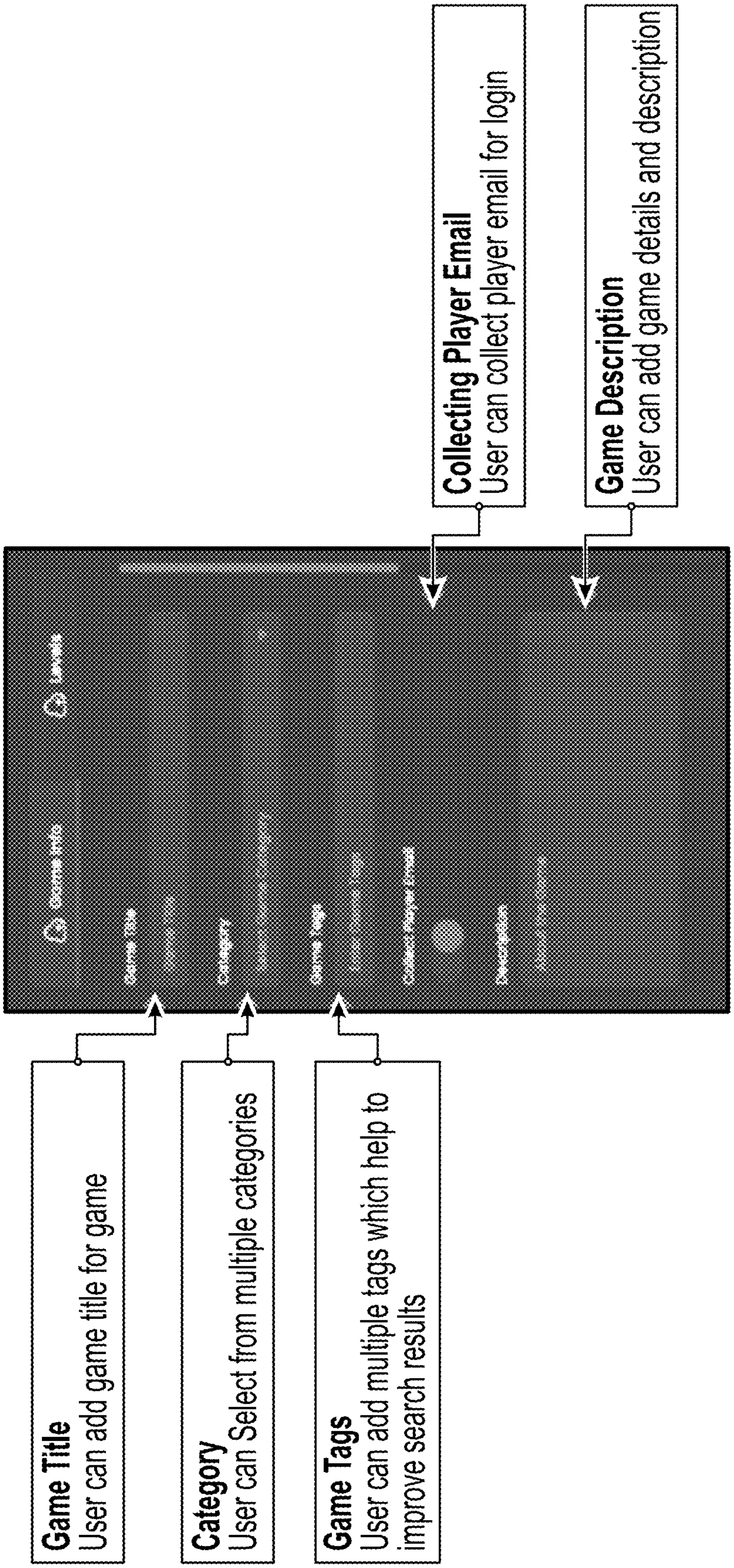

FIG. 12 shows an exemplary interface with which a user may name, categorize, tag and/or describe their created game. In an aspect, any of the text provided in any of the fields shown in FIG. 12 may be used to search for the user's game on the platform via a text-based search. In some embodiments, a user can toggle on or off the option to collect players' contact information (e.g., email addresses) for purposes of login, marketing, data collection, etc.

Figure 13:
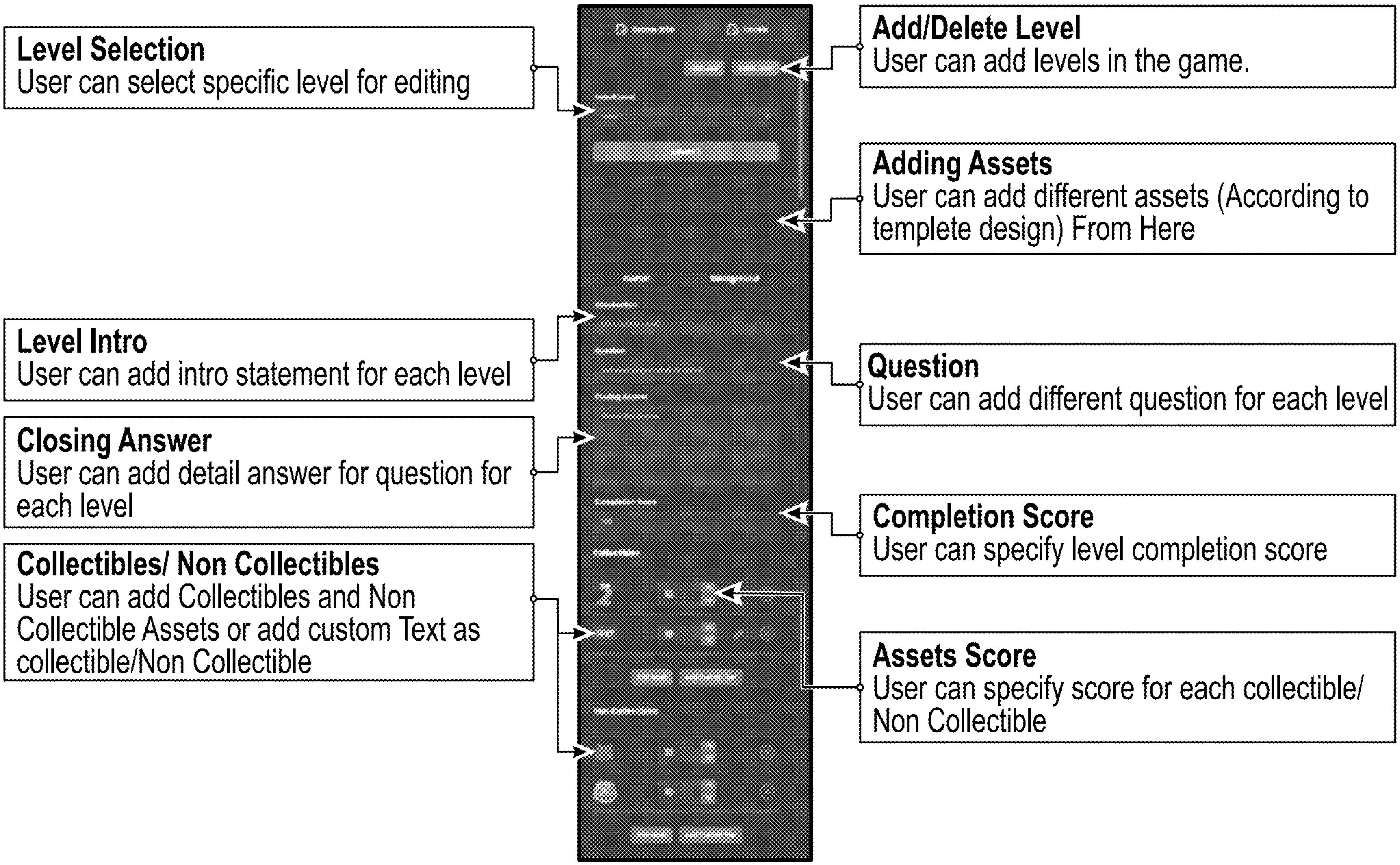

FIG. 13 shows an exemplary and non-limiting game level design interface with which a user may design individual levels or stages of a larger game.

In exemplary embodiments, the user is prompted to designate a level number for purposes of ordering levels within a game.

The user is also prompted to select assets from the available library or to upload assets into the platform.

The user is further prompted to provide introductory text for levels for players to read or hear.

The user is further prompted to add different questions or conditions for answering or satisfaction to advance through the level or to complete the level and advance to the subsequent level within the game.

The user is further prompted to specify win conditions or criteria, such as level completion scores or asset scores (i.e., where the asset score represents the number of a collectible asset that a player has collected while playing the level).

Figure 14:
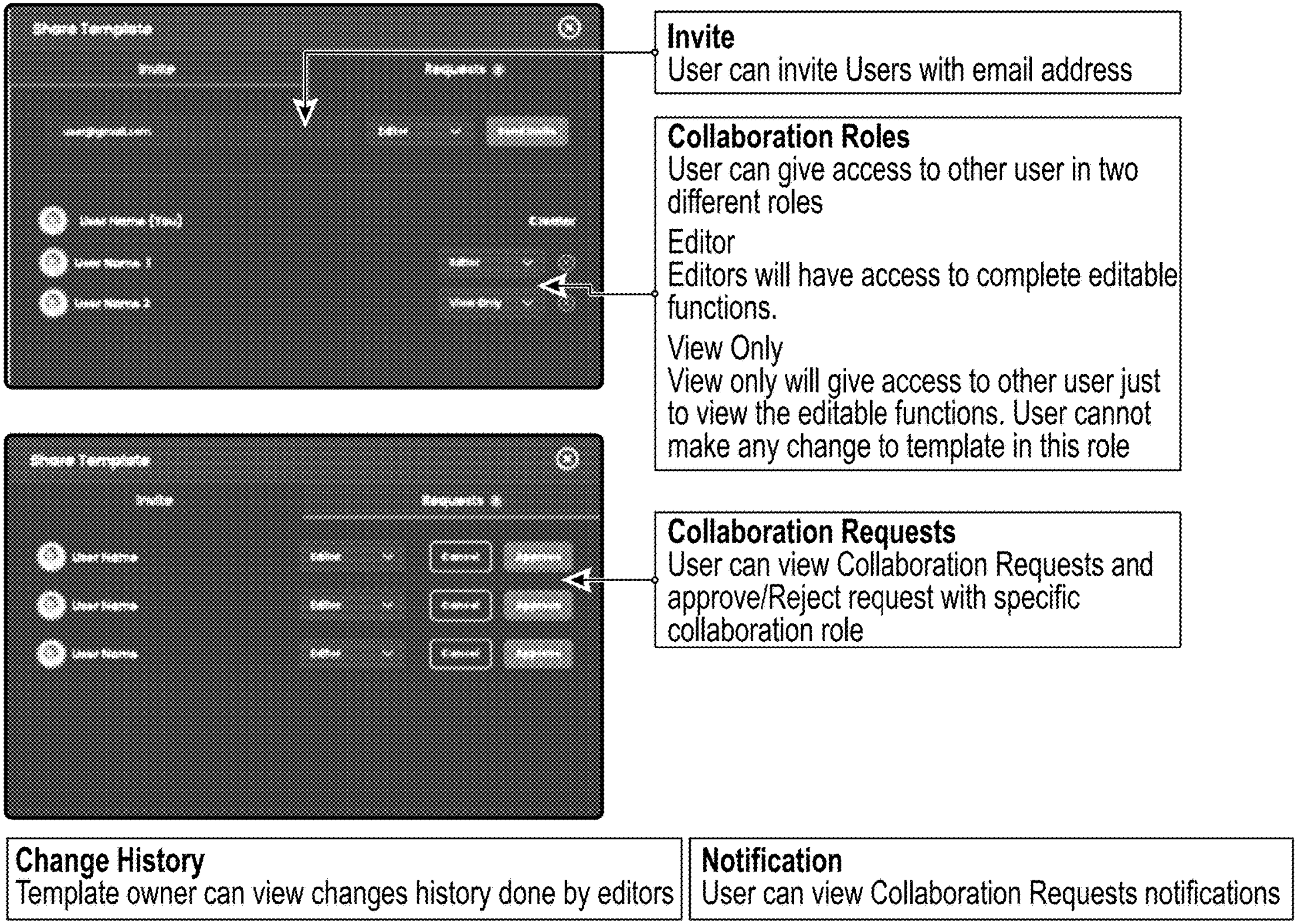

FIG. 14 shows an exemplary and non-limiting sharing template which allows a user to invite other users to collaborate in the design of a new or existing game project.

In certain embodiments, a user may assign different roles to different collaborators and allow individuals different permissions within a game project. For example, one user may be allowed to view a game project, whereas others might be allowed to view and edit the project.

Preferably, the user is provided the option to view a history of changes made to a work product.

Also, the platform optionally may provide notifications to a user when another user sends a collaboration request or responds to a sent collaboration request.

In an aspect, the platform of the present invention may use or otherwise implement a framework encoded in any coding language.

In a preferred aspect, the platform of the present invention uses or otherwise implements a Linux, Node Javascript, and/or Express Javascript framework to form the back-end system with which the end user does not interact directly.

In another preferred aspect, the platform of the present invention may use or otherwise implement a front-end framework in Javascript with which the end user directly interacts to design a piece of software, preferably gaming software. The user inputs text in response to text prompts or questions.

In an aspect, software such as gaming software is developed using the inventive platform using Unity (e.g., Unity 3D) or another application programming interface or platform based in C#coding language for the integration of software assets.

Figure 15:
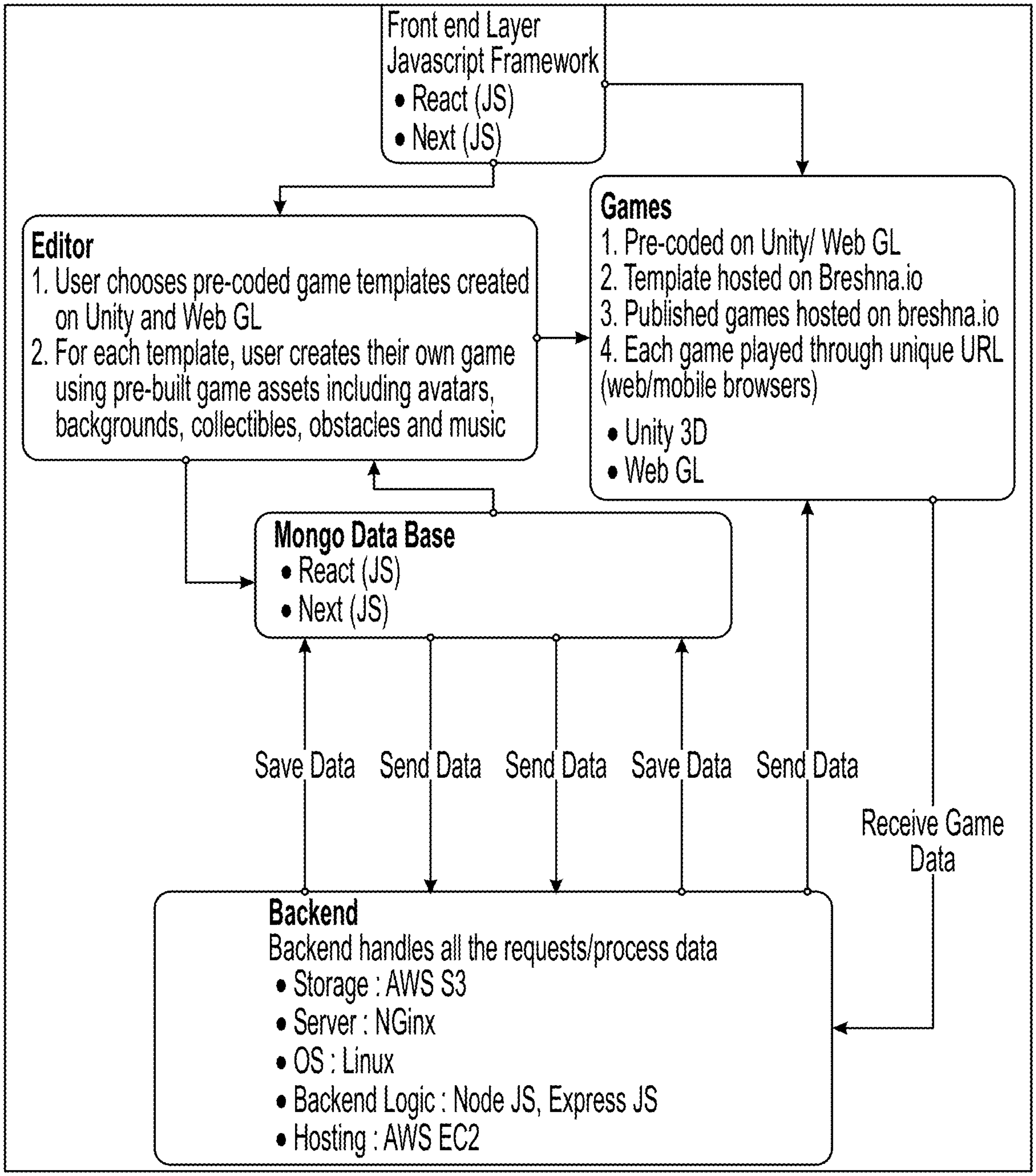
FIG. 15 shows an exemplary, non-limiting system architecture for an embodiment of the platform of the present invention.

In another aspect, software developed using the inventive platform may use WebGL or another application programming interface or platform for the rendering and/or integration of 2D and/or 3D graphics. FIG. 15 shows an exemplary architecture for the platform of the present invention.

In some embodiments, the platform permits a user to drag and drop elements into place.

In some embodiments, the platform allows users to create functionality through event-based triggers and if-then logic.

In some embodiments, the platform provides for means of creating software (e.g., video games) which tracks performance data as the software runs.

In one preferred embodiment, the platform of the present invention asks or otherwise prompts a user to input answers or instructions in response to survey questions or prompts. Once all prompts or questions have been answered or otherwise addressed, the platform automatically generates a video game.

Figure 9:
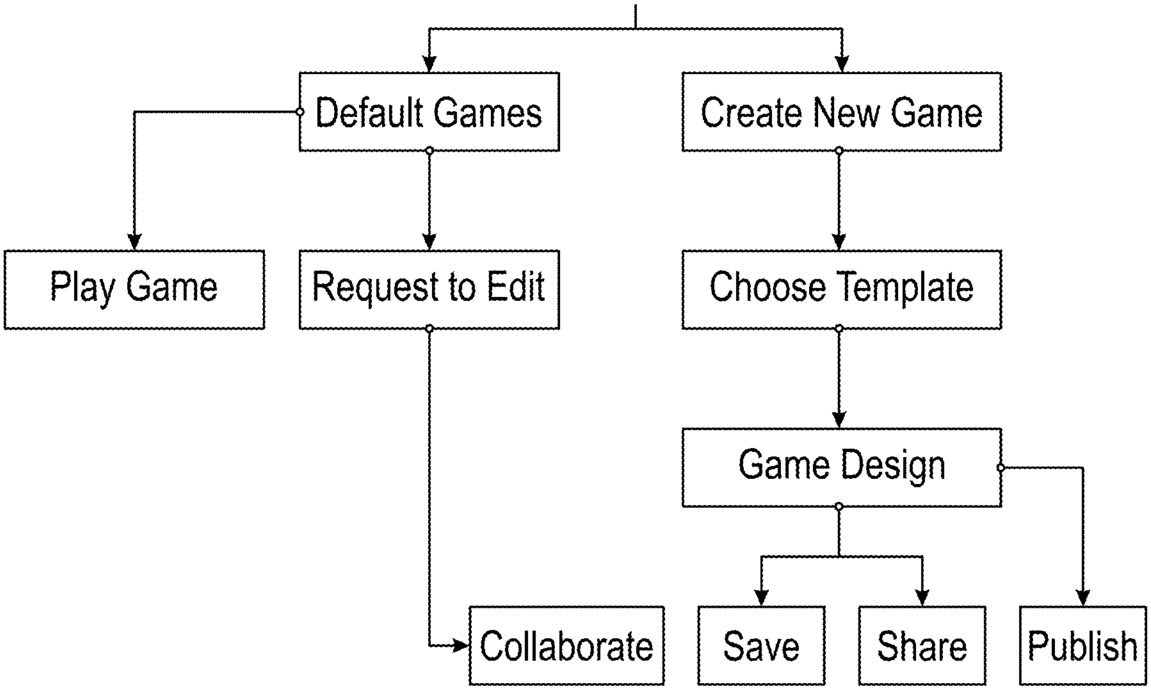
FIG. 9 shows a non-limiting process for creating a new game software (right-hand side) or using/sharing a game software within the platform (left-hand side).

A non-limiting example of the software creation process using the platform of the present invention is shown in FIG. 9 on the right-hand side. On the left-hand side of FIG. 9, an exemplary and non-limiting experience of playing a completed game created using the present invention is depicted. In certain aspects of the present invention, a completed game may be shared with other users.

Additionally or alternatively, two or more users may collaborate during the initial creation process or after a game has been completed (i.e., representing a further editing process).

In some embodiments, a user can request to edit another user's completed game.

In other embodiments, a user can send their work-in-progress or completed game to another user to request assistance in completion or editing of the game.

As discussed above, NFTs can be used to represent items or assets in games developed using the inventive platform, such as NFTs which are photos, videos, audio, and other types of digital files. In such embodiments, NFTs may be used to create unique, traceable game elements.

As used herein, an NFT is non-interchangeable and unique in that it cannot be exchanged with or replaced by another NFT.

In general applications, an NFT used or created by an individual is driven by the specific platform or ecosystem in which the NFT was created.

That is, NFTs are ordinarily made by an ecosystem or platform itself or are provided by the publisher or company providing said ecosystem or platform.

In contrast, in embodiments of the present invention, a user can input or upload an image, background, wallpaper, avatar, sprite, audio element (e.g., a tone, voice track, music track, or other audio file), video element, or other asset or element into the platform of the present invention.

In an aspect, a user may choose to convert an uploaded element to an NFT. In another aspect, a user may choose not to convert an uploaded element to an NFT.

In another aspect, where a user has created an NFT or converted an uploaded asset into an NFT in the inventive platform, said NFT may be listed to be sold or exchanged in a digital marketplace. Similarly, in embodiments where an existing NFT has been uploaded or imported into the inventive platform by a user, the user may list the NFT in a digital marketplace. In either such embodiment, the ownership of the pre-existing NFT or the uploaded or imported NFT may optionally be verified via blockchain integration. Such verification of ownership may be implemented automatically or may be initiated by the seller, the buyer, or both the seller and the buyer. Optionally, verification of ownership may be made a necessary condition to any transaction of NFTs by one or both parties to such a transaction.

In another aspect, a user may create a user-operated or user-controlled storefront or marketplace in which the user may sell or share created software and/or created or uploaded assets including assets which already existed as NFTs and assets which have been converted into NFTs.

In certain embodiments, the platform provides a library of NFT asserts for use in developing software such as a video game.

In some embodiments, the library of NFT assets comprises or consists of NFT assets which a user has imported into the library.

In other embodiments, the library of NFT assets comprises or consists of NFT assets which a user has created using the platform. In certain embodiments of the platform described herein, the platform permits users to generate NFT assets for use in software (e.g., games) developed using the platform.

In certain embodiments, an NFT asset generated using the platform may be incorporated, implemented or otherwise used in any software (e.g., game) subsequently developed using the platform. In certain embodiments, the NFT asset library may be accessed for development of any game. That is, an NFT asset generated for use in developing one piece of software may be saved or stored in the platform's NFT library, and the NFT asset may be later implemented into a wholly different piece of software (e.g., game) than the software that the NFT asset was initially designed for.

In certain other embodiments, a software-specific NFT asset library may be provided instead, which only provides NFT assets to a particular software project (e.g., game) to be developed using the platform.

In certain embodiments, creation of an NFT asset using the platform may be performed within a project (e.g., a piece of software, such as a game) being developed using the platform.

In certain other embodiments, creation of an NFT asset using the platform may be performed separately and distinctly from a project (e.g., a piece of software, such as a game) to be developed using the platform. That is, a user may use the platform to create NFT assets to be saved to the NET asset library without the need to begin working on a project and/or without the need to associate the NET asset with a specific project.

In certain embodiments, importing of an NFT asset using the platform may be performed within a project (e.g., a piece of software, such as a game) being developed using the platform.

In certain other embodiments, importing of an NFT asset using the platform may be performed separately and distinctly from a project (e.g., a piece of software, such as a game) to be developed using the platform. That is, a user may use the platform to import NFT assets to the NFT asset library without the need to begin working on a project and/or without the need to associate the NFT asset with a specific project.

Although not intended to limit the invention some exemplary uses for NFTs incorporated into the present invention include game-user specific profiles or avatars and artwork.

In some embodiments of the present invention, a user is prompted or instructed to input starting text, i.e. text which a user of the software to be created will see upon starting the software or shortly after starting the software. In the context of video games, the starting text is text which a player of the video game will read before beginning the game. See FIG. 1, for example.

Figure 2:
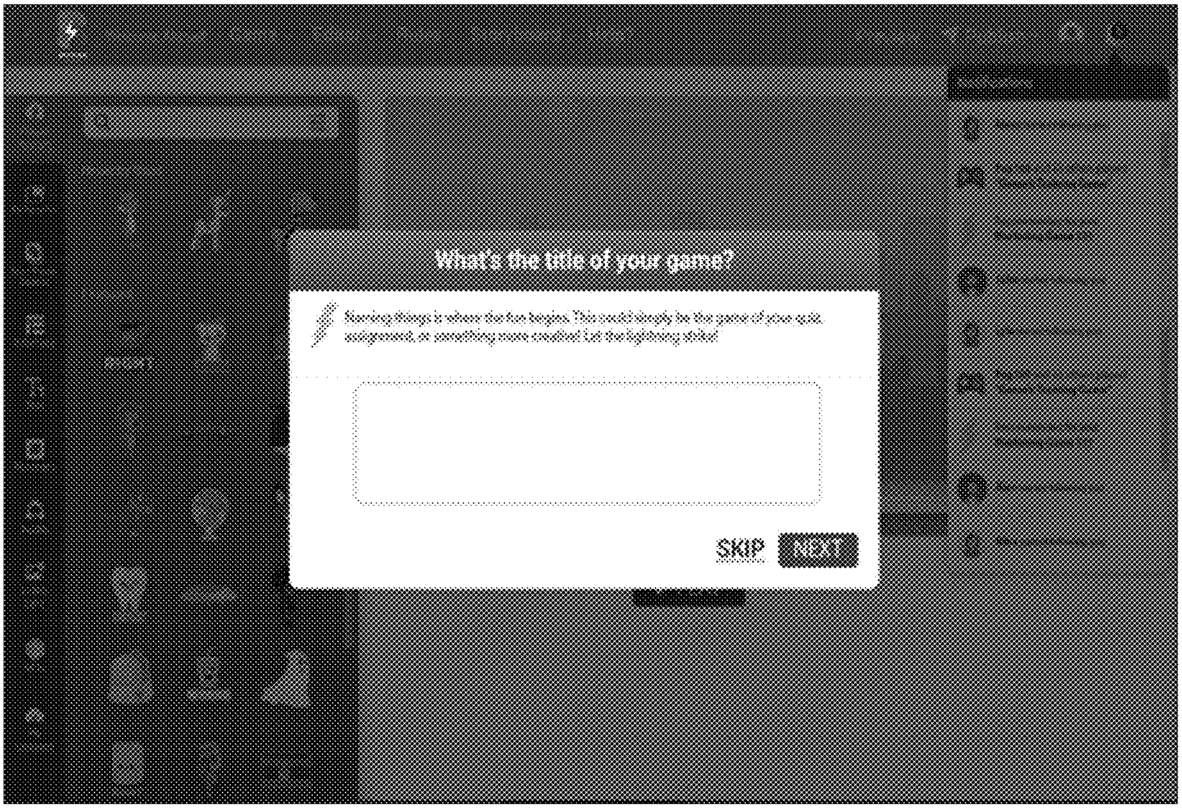

Additionally, a user of the platform will prompted to input the name of the software, such as the title of a video game developed using the platform. See FIG. 2, for example.

Figure 3:
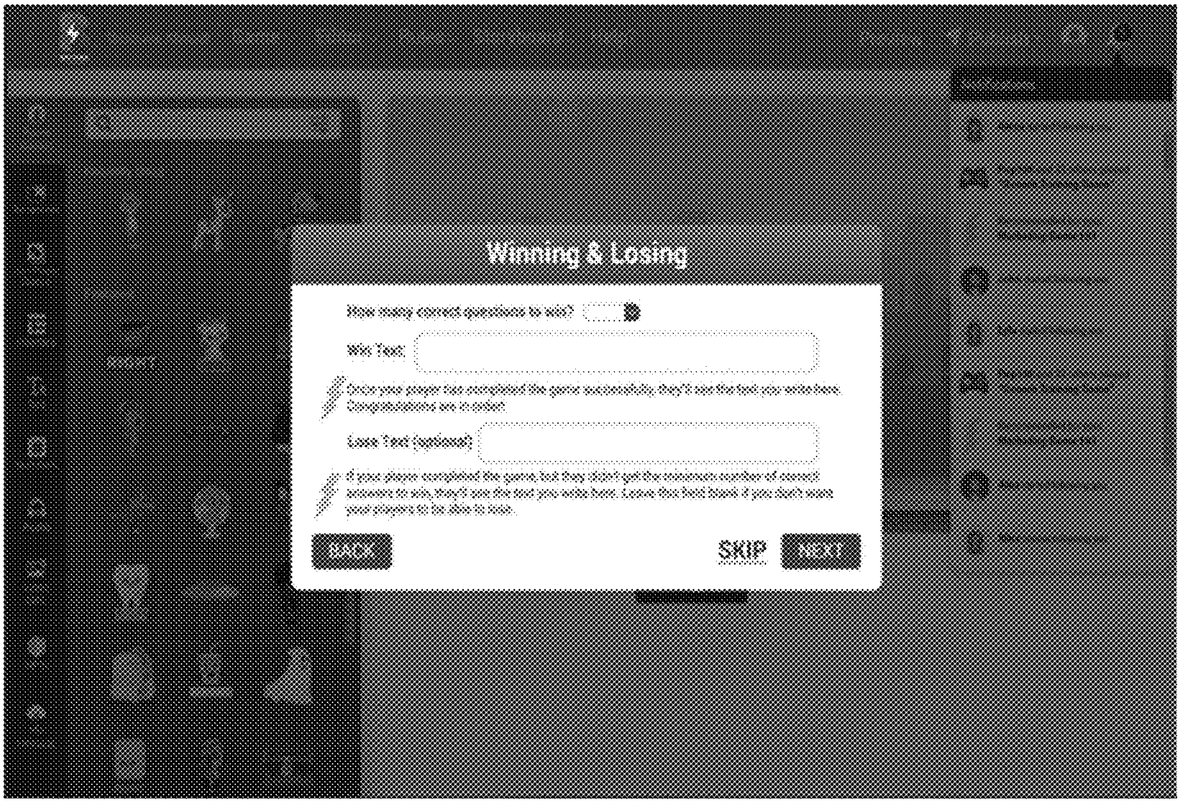

Furthermore, a user will be prompted or instructed to input text which will be displayed upon the satisfaction of a condition or the failure to satisfy the condition. For example, in the context of a video game, a user will be prompted to input text which will be displayed when a player of the video game wins the game, and the user will also be prompted to input text which will be displayed when the player loses the game. See FIG. 3, for example.

Figure 4:
Figure 6:
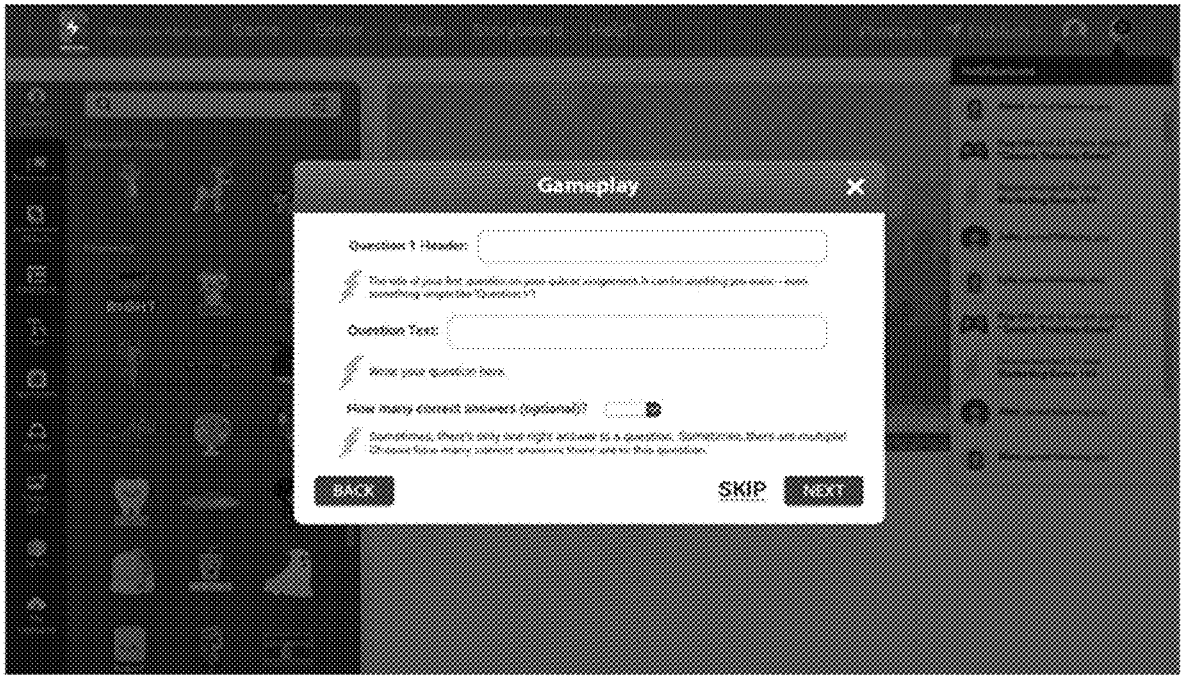
Figure 7:
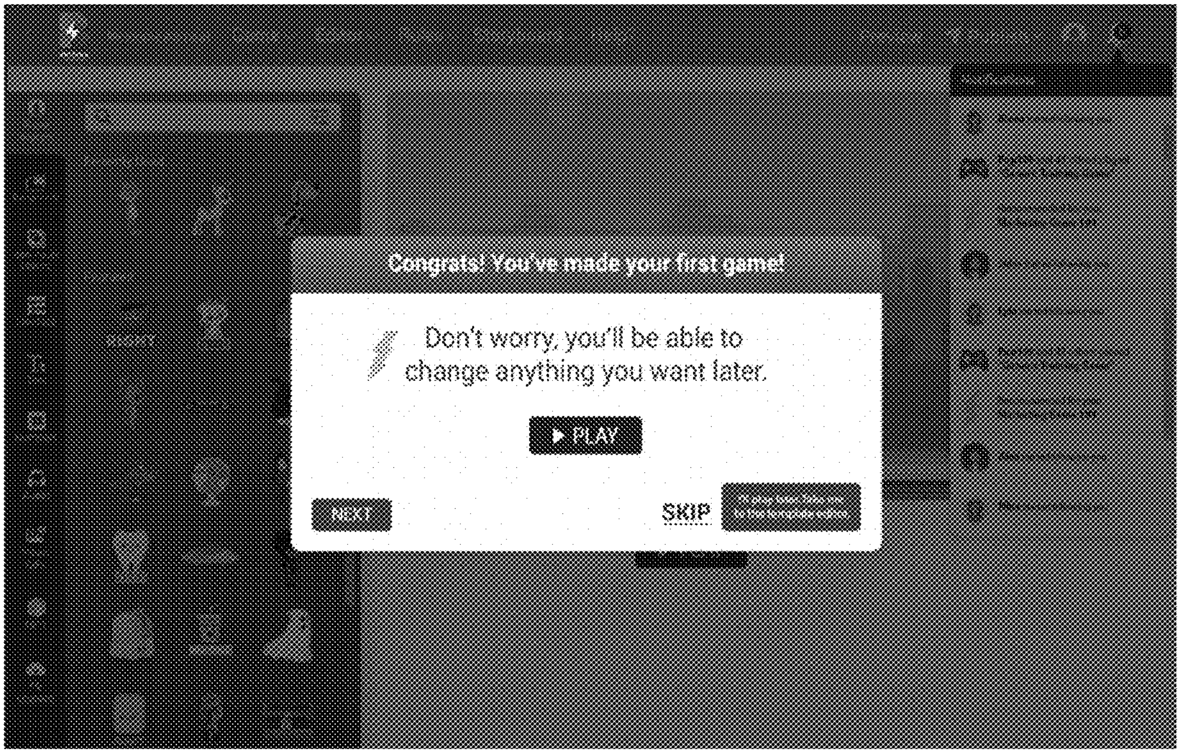
Figure 8:
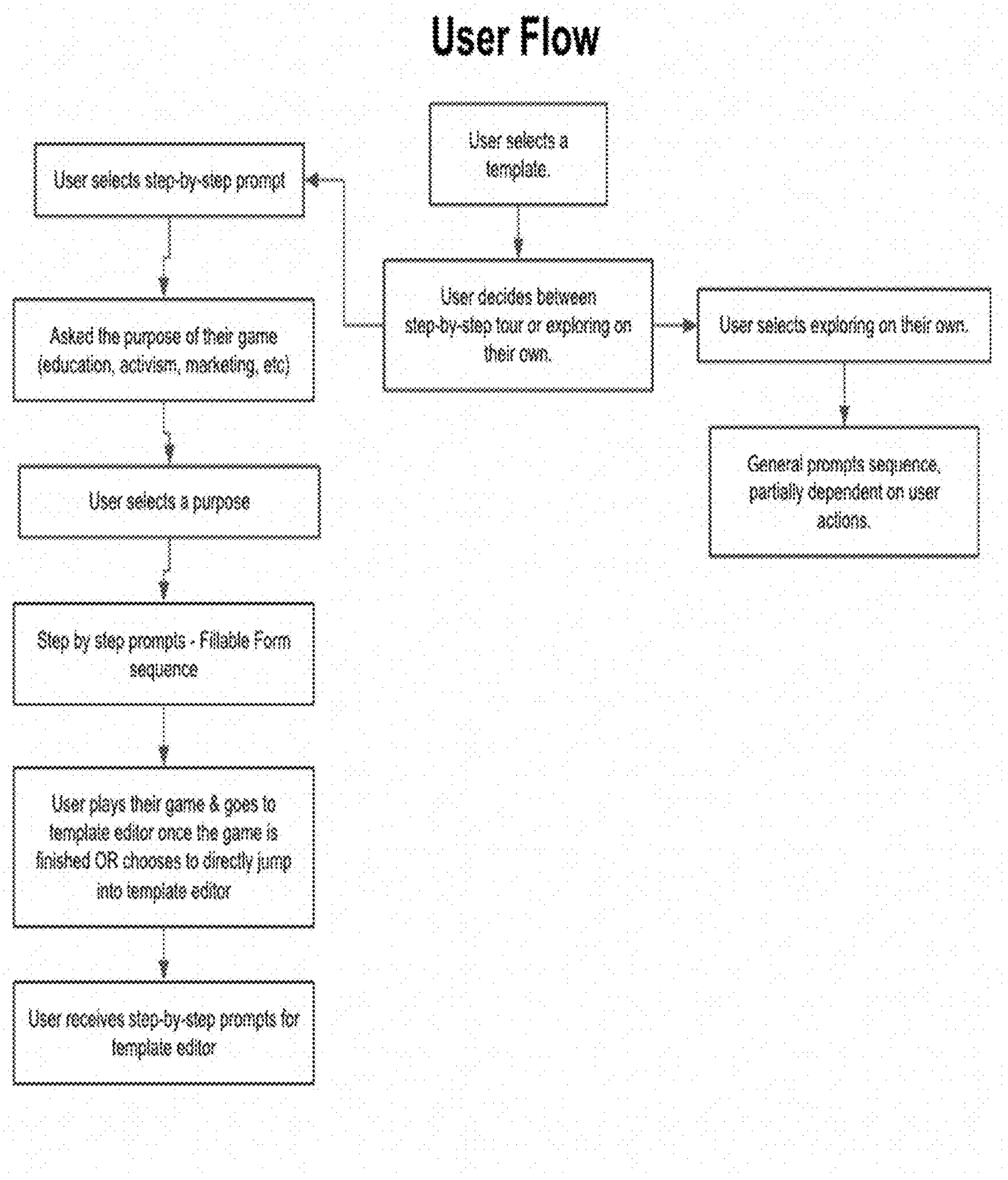
FIG. 8 is a flow chart illustrating an exemplary process for creating a video game using the platform of the present invention.

In certain embodiments, a user will be prompted or instructed to input text which will be displayed as a question or prompt to be provided to an end user of the software to be created (e.g., a player of a video game to be created). See FIGS. 4 and 6, for example.

The user will also be prompted or instructed to input text which represents or will be displayed as one or more correct answers to the question to be displayed to an end user of the software to be created (e.g., a player of a video game to be created). See FIG. 4, for example.

Figure 5:
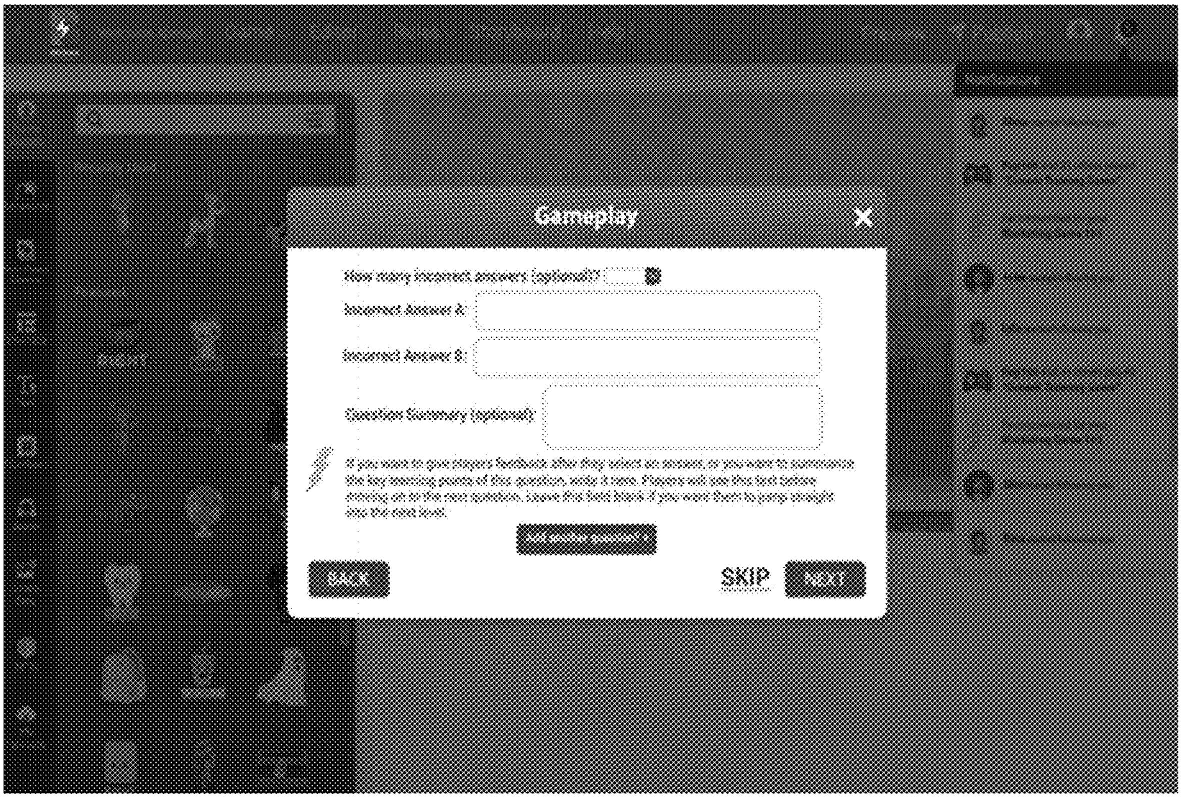

The user will also be prompted or instructed to input text which represents or will be displayed as one or more incorrect answers to the question to be displayed to an end user of the software to be created (e.g., a player of a video game to be created). See FIG. 5, for example.

In some embodiments, the user will also be prompted or instructed to select or indicate a number representing how many correct answers the question has. See FIGS. 4 and 6, for example.

In some embodiments, the user will also be prompted or instructed to select or indicate a number representing how many incorrect answers the question has. See FIG. 5, for example.

In some embodiments, the user will also optionally be prompted or instructed to input text which will be displayed as the header or descriptor for the question or prompt. See FIGS. 4 and 6, for example.

After inputting text for each correct and incorrect answer, the user of the platform may select a prompt or button which allows the user to add another question. See FIG. 5, for example.

In some embodiments, the user will also optionally be prompted or instructed to input text which will be displayed as a summary or description to be displayed after an end-user of the software to be created selects or inputs an answer or choice in response to the question or prompt. See FIG. 5, for example.

In some embodiments, the user will be prompted or instructed to indicate via textual input one or more conditions necessary for a player of a video game to satisfy to win the game and thereby trigger winning text.

In some embodiments, the user will be prompted or instructed to indicate via non-textual input one or more conditions necessary for a player of a video game to satisfy to win the game and thereby trigger winning text.

In certain embodiments, the platform does not require a user to interact with an editor window.

In certain embodiments, the platform prompts a user to indicate the purpose of the game to be created. In certain embodiments, the purpose is one or more of education, training, marketing, and/or activism.

In yet other embodiments of the present invention, the user of the platform will be prompted to select one or more assets from an asset library to create a video game.

In certain embodiments, the assets in the asset library are defined by NFTs.

The present invention further encompasses, in certain embodiments, a system comprising a back-end comprising a server, a means of storage, and an operating system, and a front-end represented in images and text, wherein said system is configured for a user to interact with the front-end and not the back-end, wherein said system is configured for the user to respond to a series of prompts (e.g., textual prompts or visual prompts) in the front end to create a piece of video gaming software, and wherein responding to the series of prompts does not comprise providing input in the form of programming language or coding syntax.

In certain embodiments, the inventive system is configured to create non-fungible tokens from user-uploaded image, audio, and/or video files.

In certain embodiments, the inventive system is configured to allow the user to share a created non-fungible token with one or more other users.

In certain embodiments, the inventive system is configured to allow the user to sell a created piece of video gaming software to one or more other users.

In certain embodiments, the inventive system is configured to allow the user to sell a created non-fungible token to one or more other users.

In certain embodiments, the inventive system is configured to allow the user to publish a created piece of video gaming software on a digital marketplace.

A person of ordinary skill in the art will appreciate additional features of the various platforms, methods and systems described herein.

It is claimed:

1. A platform for creating software, the platform comprising (a) an assortment of templates to build software without a platform user directly entering source code or object code, and (b) an asset library, and wherein the platform permits the platform user to create a marketplace to sell or exchange created software, created assets, and or uploaded assets.

2. The platform according to claim 1, wherein the asset library comprises non-fungible tokens (NFTs).

3. The platform according to claim 1, wherein the asset library comprises at least one asset created by the platform user.

4. The platform according to claim 3, wherein the at least one asset created by the platform user is an NFT.

5. The platform according to claim 1, wherein the platform permits the platform user to upload one or more assets.

6. The platform according to claim 5, wherein the one or more uploaded assets exists as an NFT prior to upload, and wherein the NFT represents an item selected from images, video recordings, and audio recordings.

7. The platform according to claim 5, wherein the platform permits the platform user to create an NFT from an uploaded asset.

8. The platform according to claim 1, further comprising a digital marketplace for the sale or exchange of software created using the platform.

9. The method according to claim 1, further comprising publishing the software in a digital marketplace.

10. A method of creating software, the method comprising: selecting a template from an assortment of templates, responding to a series of prompts in the selected template, and selecting one or more assets from an asset library and/or uploading at least one asset, wherein the at least one uploaded asset does not exist as an NFT prior to uploading, and converting the at least one uploaded asset is converted to an NFT after uploading, and wherein responding to the series of prompts does not comprise providing input in the form of programming language or coding syntax.

11. The method according to claim 10, wherein the series of prompts comprises one or more textual prompts.

12. The method according to claim 10, wherein the series of prompts comprises one or more visual prompts.

13. The method according to claim 10, wherein the asset library comprises one or more assets in the form of NFTs.

14. The method according to claim 10, wherein the at least one uploaded asset exists as an NFT prior to uploading and wherein the NFT represents an item selected from images, video recordings, and audio recordings.

15. The method according to claim 14, further comprising verifying ownership of the NFT.

16. The method according to claim 10, further comprising verifying ownership of the NFT.

* * * * *